United States Patent [19]

Goto et al.

[11] Patent Number: 5,252,392
[45] Date of Patent: Oct. 12, 1993

[54] MAGNETIC RECORDING MEDIUM COMPRISING MULTIPLE MAGNETIC LAYERS WITH SPECIFIED COMPOSITION AND PROPERTIES

[75] Inventors: Narito Goto; Nobuyuki Sekiguchi, both of Hino, Japan

[73] Assignee: Konica Corporation, Tokyo, Japan

[21] Appl. No.: 903,379

[22] Filed: Jun. 24, 1992

[30] Foreign Application Priority Data

Jul. 5, 1991 [JP] Japan .................. 3-190977

[51] Int. Cl.$^5$ .............................................. G11B 5/00
[52] U.S. Cl. .................................. 428/336; 428/402; 428/425.9; 428/522; 428/694 BM; 428/900; 428/694 BA; 428/694 BN; 428/694 BR; 428/694 BG
[58] Field of Search ............... 428/694, 900, 336, 402, 428/212, 522, 425.9

[56] References Cited

U.S. PATENT DOCUMENTS

| | | | |
|---|---|---|---|
| 4,666,754 | 5/1987 | Arioka et al. | 428/141 |
| 4,946,740 | 8/1990 | Ono et al. | 428/323 |
| 5,026,598 | 6/1991 | Koyama et al. | 428/323 |

FOREIGN PATENT DOCUMENTS 1-019524 1/1989 Japan .

Primary Examiner—Stevan A. Resan
Attorney, Agent, or Firm—Jordan B. Bierman

[57] ABSTRACT

A magnetic recording medium is disclosed. The medium comprises a support and provided thereon, a plurality of magnetic layers containing a magnetic powder and a binder, wherein an outermost magnetic layer of said magnetic layers comprises a ferromagnetic metal powder having an average major axis length of not more than 0.25 $\mu$m and a crystallite size of not more than 200 Å and carbon black having an average particle diameter of not less than 30 m$\mu$ in an amount of not more than 1% by weight, said outermost magnetic layer having a thickness of not more than 1 m$\mu$ and a surface roughness $R_{10z}$ of not more than 50 nm, and at least one magnetic layer other than said outermost layer comprises a cobalt-containing magnetic iron oxide powder having an average major axis length of not less than 0.25 $\mu$m and a crystallite size of not less than 250 Å, said magnetic layer having a coercive force of from 500 to 1200 Oe.

8 Claims, 4 Drawing Sheets

MAGNETIC RECORDING MEDIUM COMPRISING MULTIPLE MAGNETIC LAYERS WITH SPECIFIED COMPOSITION AND PROPERTIES

FIELD OF THE INVENTION

This invention relates to a magnetic recording medium such as a magnetic disk, a magnetic tape or a magnetic sheet.

BACKGROUND OF THE INVENTION

In recent years, recording mediums are directed toward those having a much higher performance, and there is a demand for the advent of magnetic disks and magnetic tapes having electromagnetic conversion characteristics high enough to enable high-density recording.

In order to improve electromagnetic conversion characteristics of magnetic recording mediums, various attempts have been hitherto made, e.g., attempts to use magnetic powders having a high saturation magnetization, to make particles of magnetic powder finer and improve the dispersibility that comes into question as a result thereof, and, with regard to magnetic layers, to use a multi-layer system, to improve squareness ratio, coercive force and saturation flux density, and also to control surface smoothness.

In the attempt to make particles of magnetic powder finer, it has become popular to use, for example, a ferromagnetic metal powder with fine particles which are made increasingly finer as magnetic tapes of an 8 mm type such as a high-band 8 mm system are made to have a higher image quality.

However, as particles are made finer as stated above, magnetic tapes may cause, e.g., the following problems:
1) Edge damage that is caused by a decrease in Young's modulus, and a poor running durability due to the sticking of tape.
2) Chroma output drop.
3) A poor transfer performance.
4) A lowering of detectability at the tape end because of an increase in light transmittance.
5) Output drop after tape running under low humidity (40° C., 20%).

Japanese Patent Publication Open to Public Inspection (hereinafter referred to as Japanese Patent O.P.I. Publication) No. 19524/1989 discloses a technique in which a ferromagnetic metal powder with an average major axis length of less than 0.25 μm and a crystallite size of less than 200 Å is used in the outermost layer and a ferromagnetic metal powder with an average major axis length of not less than 0.25 μm and a crystallite size of not less than 250 Å is used in a layer other than the outermost layer.

The above technique can overcome the problems 3) and 4) to a certain extent, but still has had problems regarding the poor running durability in the item 1), the chroma output drop in the item 2) and the output drop after tape running under low humidity (40° C., 20%) in the item 5). In addition, in this technique, a magnetic powder with an average major axis length of not less than 0.25 μm and a crystallite size of not less than 250 Å, which is relatively large in size, is used in a layer other than the outermost layer so that transfer performance and light screening properties of tapes can be improved, and hence has had the disadvantage that the surface properties of a lower layer become poor to make large the surface roughness of the outermost magnetic layer, rather resulting in a lowering of electromagnetic conversion characteristics.

As for the drop of chroma output stated above, Japanese Patent O.P.I. Publications No. 53022/1992 and No. 61023/1992 each disclose an improved technique to solve the problem, but can not be said to be a satisfactory improvement from the viewpoint of practical use.

SUMMARY OF THE INVENTION

An object of the present invention is to provide a magnetic recording medium having high electromagnetic conversion characteristics, in particular, a high chroma output, and also superior running durability and weatherability.

The present invention is concerned with a magnetic recording medium comprising a support and formed thereon a plurality of magnetic layers containing a magnetic powder, wherein;

the outermost layer of said magnetic layers comprises a ferromagnetic metal powder having an average major axis length of not more than 0.25 μm and a crystallite size of not more than 200 Å and a carbon black having an average particle diameter of not less than 30 mμ and contained in an amount of not more than 1% by weight, and has a dried coating thickness of not more than 1 μm and a surface roughness $R_{10z}$ of not more than 50 nm; and at least one magnetic layer other than said outermost layer comprises a cobalt-containing magnetic iron oxide powder having an average major axis length of not less than 0.25 μm and a crystallite size of not less than 250 Å, and said magnetic layer has a coercive force of from 500 to 1,200 Oe.

DETAILED DESCRIPTION OF THE INVENTION

Figure 1:
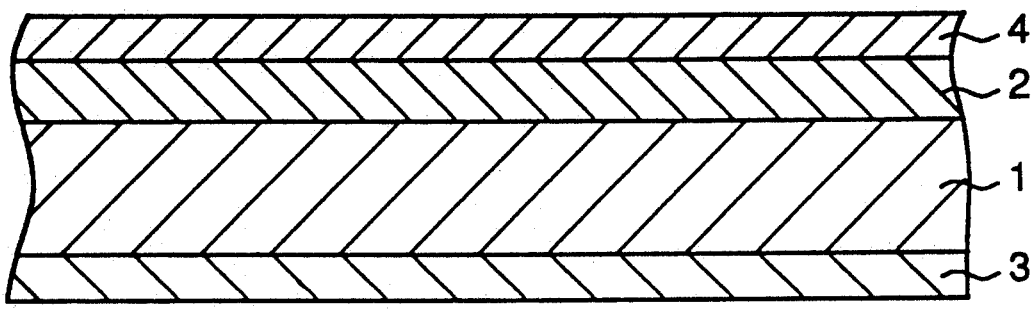
FIG. 1 cross-sectionally illustrates an example of a multi-layer coating magnetic recording medium.

The ferromagnetic metal powder described above may preferably have an average major axis length of less than 0.18 μm and a crystallite size of not more than 180 Å, and may more preferably have an axis ratio of less than 10. As metals that constitute the magnetic powder, the metal powder may preferably contain at least iron and aluminum. The iron and aluminum may preferably be in a ratio of Fe:Al = 100:0.5 to 100:20. In addition to Al, the ferromagnetic metal powder may preferably further contain Ca, where Fe and Ca may preferably be in a ratio of Fe:Ca = 100:0.1 to 100:10.

Besides the foregoing, in the cobalt-containing iron oxide, the weight ratio of $Fe^{2+}$ and $Fe^{3+}$, i.e., $Fe^{2+}/Fe^{3+}$ may be not less than 0.08. This is also preferable for an improvement in electromagnetic conversion characteristics.

To solve the problems previously discussed, i.e., 1) a deterioration of running durability accompanied with a decrease in Young's modulus, 2) a deterioration of electromagnetic conversion characteristics including chroma output and 3) output drop after tape running under low humidity (40° C., 20% RH), it has been found necessary to satisfy the following conditions:

(1) At least one layer other than the outermost layer (hereinafter "lower layer") contains a cobalt-containing magnetic iron oxide powder having an average major axis length of not less than 0.25 μm and a crystallite size of not less than 250 Å.

(2) The outermost magnetic layer (hereinafter "upper layer") has a dried coating thickness of not more than 1 μm.

(3) The upper layer has a surface roughness ($R_{10z}$) of not more than 50 nm.

(4) The lower layer has a coercive force of from 500 to 1,200 Oe.

(5) The upper layer contains a carbon black having an average particle diameter of not less than 30 mμ, in an amount of not more than 1% by weight.

The present invention has been thus accomplished.

The magnetic powder used in the upper layer of the present invention is a ferromagnetic metal powder. The ferromagnetic metal powder includes a metal powder solely composed of Fe, Ni, Co or the like and a metal powder mainly composed of any of these, e.g., that of an Fe-Al type, an Fe-Ni type, an Fe-Al-Ni type or the like. Examples of these ferromagnetic metals are disclosed in Japanese Patent O.P.I. Publication No. 277325/1989, page 2, left lower column, line 18 to right upper column, line 18.

The ferromagnetic metal powder herein used has an average major axis length of not more than 0.25 μm and a crystallite size of not more than 200 Å. In order to more improve the electromagnetic conversion characteristics, it may preferably have an average major axis length of less than 0.18 μm and a crystallite size of not more than 180 Å, and more preferably an average major axis length of not more than 0.15 μm and a crystallite size of not more than 150 Å. The axis ratio of the magnetic powder may be less than 10, and preferably be 6 to 9. This is preferable for an improvement in electromagnetic conversion characteristics.

A magnetic powder with an average major axis length larger than 0.25 μm or a crystallite size larger than 200 Å may cause an increase in noise and makes it difficult to obtain sufficient electromagnetic conversion characteristics. Thus, the present invention can not be effective in either case. A magnetic powder whose axis ratio is more than 10 also may cause an increase in noise and makes it difficult to obtain sufficient electromagnetic conversion characteristics.

The average major axis length refers to an average value obtained by measuring the average major axis length of 500 particles of ferromagnetic metal powder observed by transmission type electron micrography. The crystallite size is measured by Sherrer method making use of Si powder as a standard, using the integral width of (110) diffraction rays of Fe obtained by an X-ray analyzer. The axis ratio is determined as (average major axis length/average minor axis length) by measuring the average major axis length and average minor axis length of 500 particles observed by transmission type electron micrography.

Besides the foregoing, as a structure of a preferred ferromagnetic metal powder, the ferromagnetic metal powder may contain Fe and Al, which may be in a proportion of Fe:Al=100:0.5 to 100:20 in atom number ratio. Use of the ferromagnetic metal powder satisfying this condition can bring about more improvements in electromagnetic conversion characteristics, running durability and weatherability of the magnetic recording medium of the present invention.

The above Fe-Al type ferromagnetic metal powder may preferably further contain Ca, which may be in a proportion of Fe:Ca=100:0.1 to 100:10 in atom number ratio. This can give a magnetic recording medium much superior in the electromagnetic conversion characteristics and running durability.

The content of the ferromagnetic metal powder in the upper layer is 60 to 90% by weight, and preferably 75 to 85% by weight.

As for the magnetic powder used in the lower layer, it is a cobalt-containing iron oxide (Co-containing $FeO_x$, $1.33 \leq x \leq 1.50$). As the particles of the ferromagnetic metal powder used in the upper layer are made finer, the running durability is lowered presumably because of a decrease in the Young's modulus. This becomes remarkable particularly when those having an average major axis length of not more than 0.15 μm, a crystallite size of not more than 150 Å or an axis ratio of less than 10 are used. In such a case, as the magnetic powder in the lower layer, use of the cobalt-containing iron oxide powder comprised of relatively large crystals, having an average major axis length of not less than 0.25 μm and a crystallite size of not less than 250 Å makes it possible to increase the Young's modulus of the lower layer, so that the Young's modulus of the whole magnetic layers can be brought to a proper state.

The cobalt-containing iron oxide powder may preferably have an average major axis length of not less than 0.30 μm and a crystallite size of not less than 300 Å, and more preferably an average major axis length of from 0.35 to 0.45 μm and a crystallite size of from 350 to 500 Å.

The atom number ratio of $Fe^{2+}$ and $Fe^{3+}$ in the cobalt-containing iron oxide, i.e., $Fe^{2+}/Fe^{3+}$ may preferably be not less than 0.08 since the residual flux density of the lower magnetic layer can be increased and the chroma output can be improved. It may more preferably be from 0.15 to 0.45.

The cobalt-containing iron oxide may preferably further contain silicon and/or aluminum. These elements, when deposited on or incorporated in the surface of the magnetic powder particles having a high surface activity, are effective for decreasing the quantity of adsorption of a lubricant to the magnetic powder, for improving the dispersibility of the magnetic powder in the magnetic layer and besides for improving the surface properties of the lower layer.

The silicon can be deposited on or incorporated in the magnetic powder particles by, for example, adding a soluble silicon compound to a dispersion prepared by dispersing the magnetic powder in an aqueous alkali solution. Such a silicon compound may include, for example, silicic acids such as orthosilicic acid, metasilicic acid, metabisilicic acid, metatrisilicic acid and metatetrasilicic acid, silicon monoxide, silicon dioxide, and silicon metal salts such as sodium orthosilicate, sodium metasilicate, potassium metasilicate, calcium orthosilicate, calcium metasilicate, barium metasilicate and cobalt metasilicate. Any of these silicon compounds may be used alone or may be used in combination of two or more compounds.

The aluminum can be deposited on or incorporated in the magnetic powder particles in the same manner as the method by which the silicon is deposited on or incorporated in the magnetic powder particles, where the above silicon compound may be replaced with aluminum oxide, aluminum chloride, aluminum fluoride, aluminum bromide, aluminum iodide, aluminum hydroxide, aluminum sulfate, aluminum nitrate, aluminum phosphate, aluminum carbide, aluminum nitride or aluminum sulfide. Aluminum powder or the aluminum compound as described above may be added to the dispersion.

Any of silicon and aluminum may preferably be deposited on or contained in the cobalt-containing magnetic iron oxide powder particles according to the present invention. More preferably at least silicon may be deposited on or contained in them. Particularly preferably both silicon and aluminum may be deposited on or contained in them. The silicon may preferably be contained in an amount of from 0.05 to 3.0% by weight, and more preferably from 0.1 to 2.5% by weight, based on the cobalt-containing magnetic iron oxide powder. The aluminum may preferably be contained in an amount of from 0.01 to 2.5% by weight, and more preferably from 0.1 to 2.0% by weight, based on the same. In the case where both the silicon and the aluminum are contained, they may preferably be in an amount of from 0.1 to 4.0% by weight, and more preferably from 0.1 to 3.0% by weight, in total based on the magnetic powder. The silicon and the aluminum may preferably be in a weight ratio of Si/Al of from 1.5 to 20, and more preferably from 3 to 15.

The content of the cobalt-containing iron oxide in the lower layer is 60 to 90% by weight, and preferably 75 to 85% by weight.

In the present invention, binders usable in the magnetic layers may include polyurethane resins, polyester resins, vinyl chloride resins and besides those exemplified in Japanese Patent O.P.I. Publication No. 154320/1990, page 3, right upper column, lines 2 to 20. A negative organic group may preferably be introduced into at least one of the binders contained in the respective layers.

The negative organic group can be exemplified by $-SO_3M$, $-PO(OM')_2$, $-OSO_3M$, $-COOM$ (wherein M represents a hydrogen atom or an alkali metal atom, M' represents a hydrogen atom, an alkali metal atom or an alkyl group). In particular, $-SO_3M$, $-PO(OM)_2$ and $-COOM$ (wherein M represents a hydrogen atom, Li, Na or K) are preferable for improving the electromagnetic conversion characteristics and durability of the medium. In the case where a binder into which any of these negative organic groups has been introduced is used in the lower layer, its surface properties can be improved.

The negative organic group contained in the binder for each layer may preferably be in a content of from 0.1 to 8.0 mol %, and more preferably from 0.5 to 6.0 mol %, based on each binder having the negative organic group, in order to improve the dispersibility of the magnetic powder. If it is in a content less than 0.1 mol %, the dispersibility may be lowered, and if it is in a content more than 8.0 mol %, a magnetic coating composition tends to gel. The binder may preferably have a weight average molecular weight of from 15,000 to 80,000. The binder in a magnetic layer should be in a content ranging from 5 to 40 parts by weight, and preferably from 5 to 30 parts by weight, based on 100 parts by weight of the magnetic powder.

The binder used in each magnetic layer may preferably be in combination of a polyurethane and/or polyethylene and a vinyl chloride resin. In this case, the polyurethane and/or polyethylene and the vinyl chloride resin may be in a proportion usually ranging from 100:0 to 10:90, and preferably from 90:10 to 30:70, in weight ratio.

In the present invention, the upper layer may contain carbon black with an average particle diameter of not less than 30 mμ, in an amount of not more than 1% by weight. This enables decrease in coefficient of friction substantially without a lowering of electromagnetic conversion characteristics, so that the running durability can be improved. The carbon black may preferably have an average particle diameter of from 35 to 100 mμ, and more preferably from 40 to 75 mμ. The carbon black may preferably be contained in an amount of from 0.2 to 0.9% by weight, and more preferably from 0.3 to 0.8% by weight. In addition, use of carbon black with a BET specific surface area of not more than 80 $m^2/g$ and an oil absorption of not less than 100 ml/g can be more effective for the above improvement.

Carbon black suitable for use in the present invention may include VALCAN XC-72, available from Cabot Corp. (BET: 254 $m^2/g$; particle diameter: 30 mμ), HS100, available from Denki Kagaku Kogyo K. K. (BET: 32 $m^2/g$; DBP: 180 ml/100 g; particle diameter: 53 mμ), #22B, available from Mitsubishi Chemical Industries Limited (BET: 55 $m^2/g$; DBP: 131 ml/100 g; particle diameter: 40 mμ), #20B, ditto (BET: 56 $m^2/g$; DBP: 115 ml/100 g; particle diameter: 40 mμ), #3500, ditto (BET: 47 $m^2/g$; DBP: 187 ml/100 g; particle diameter: 40 mμ), and those disclosed in Japanese Patent O.P.I. Publication No. 154320/1990, page 5, left upper column, line 19 to right lower column, line 3, or Japanese Patent O.P.I. Publication No. 63928/1991, page 6, left lower column, line 16 to page 7, left upper column, line 12.

In the present invention, the magnetic layer (upper layer) has a surface roughness $R_{10z}$ of not more than 50 nm, which may preferably be not more than 30 nm, and more preferably not more than 20 nm.

Figure 5:
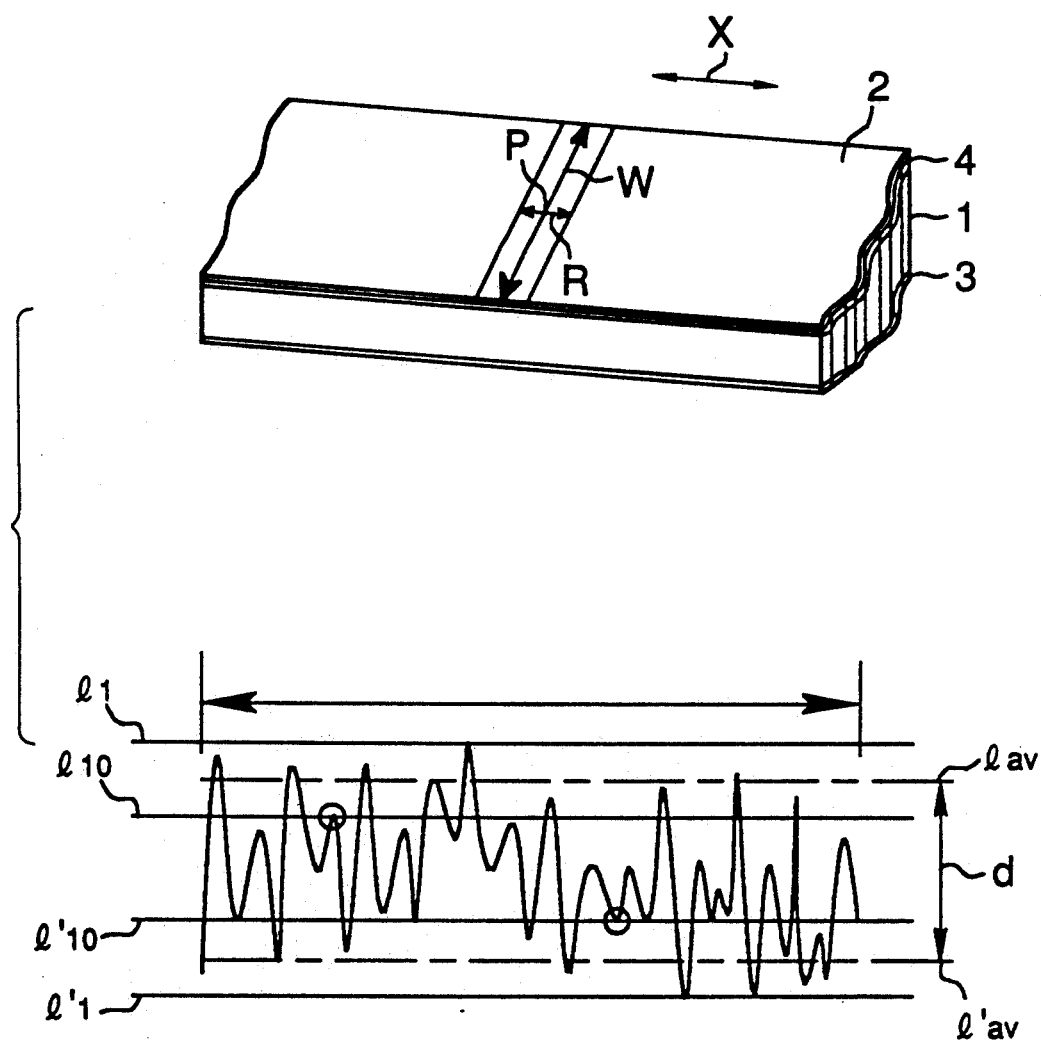
FIG. 5 illustrates a manner by which surface roughness $R_{10z}$ is measured.

The surface roughness $R_{10z}$ refers to a value measured in the following manner: For example, as shown in FIG. 5, a magnetic recording medium is vertically cut by a standard length at a standard point P within the range of ±2 mm from that point, where, among straight lines parallel to the horizontal line that crosses an external surface contour curve at the cutting plane, ten straight lines including a line $l_1$ that passes the highest peak of the curve to a line $l_{10}$ that passes the tenth lower peak than the highest peak and ten straight lines including a line $l'_1$ that passes the lowest bottom of the curve to a line $l'_{10}$ that passes the tenth higher peak than the lowest bottom are selected. Next the distances from the standard line (arbitrary) parallel to said horizontal line to each of the ten straight lines stated above are measured. Then, two straight lines $l_{av}$ and $l'_{av}$ that are parallel to the horizontal line and pass though an average value of the distances of the former 10 straight lines and an average value of the distances of the latter 10 straight lines are respectively found. A distance d between these two straight lines is measured in the direction of longitudinal magnification of the external surface contour curve to obtain the intended value.

The $R_{10z}$ can be measured using Talystep Roughness Meter (manufactured by Rank Taylor Hobson Corp.) under conditions of a stylus size of 2.5×0.1 μm, a stylus force of 2 mg, a cut-off filter frequency of 0.33 Hz, a measuring speed of 2.5 μm/sec and a standard length of 0.5 mm. In the roughness curve, unevenness of 0.002 μm or less is omitted.

In order to control the $R_{10z}$ to be not more than 50 nm, the surface properties of the lower layer must be improved. For this purpose, the lower layer may be formed by the following means.

1) As previously described, a material containing a negative organic group, in particular, a sulfo group, a phospho group or a carboxyl group, is used as the binder.
2) Prior to usual dispersion, materials are kneaded using a kneader having a high shear force as exemplified by a pressure kneader or a continuous kneader.
3) As previously described, a magnetic powder surface-treated with Si and/or Al is used as the magnetic powder.

Besides, what is intended can be achieved also by, for example, setting the calendering conditions as described below in the manufacturing steps described later, to control the surface smoothness of the magnetic layer. That is, in this surface smoothing treatment, the factors to be controlled as calendering conditions may include temperature, linear pressure and C/S (coating speed). Other factors may also include the size and quantity of the particles added in the magnetic layer.

The calendering conditions may preferably be so kept as to give a temperature of from 50° to 150° C., a linear pressure of from 50 to 400 kg/cm and a C/S of from 20 to 600 m/min. Conditions outside these numerical values may make it difficult to specify the surface state of the magnetic layer as in the present invention or make it impossible to do so.

The support according to the present invention may be formed of known materials such as polyethylene terephthalate, polyethylene-2,6-naphthalate, polyamide, polyimide and polycarbonate, including those disclosed, for example, in Japanese Patent O.P.I. Publication No. 260122/1990, page 2, right lower column, line 3 to page 3, left upper column, line 10.

Besides, the magnetic layer may optionally contain additives such as a dispersant, a lubricant, an abrasive and an antistatic agent.

The dispersant may include fatty acids such as palmitic acid, stearic acid, lauric acid, myristic acid and oleic acid, phosphoric esters and alkyl succinate sulfonate, also including those disclosed, for example, in Japanese Patent O.P.I. Publication No. 249129/1990, page 4, left upper column, lines 3 to 11.

The lubricant may include fatty acid esters such as butyl stearate or oleyl oleate, 2-ethylhexyl stearate, dioleyl adipate, 2-ethylhexyl palmitate, butyl palmitate and lauryl oleate, the fatty acids stated above and silicone oil, also including those disclosed, for example, in Japanese Patent O.P.I. Publication No. 199616/1990, page 8, left lower column, line 1 to page 9, left lower column, line 8.

The abrasive may include alumina, chromium oxide, α-iron oxide (red iron oxide), boron nitride, silicon carbide, zirconium oxide and silicon oxide, also including those disclosed, for example, in Japanese Patent O.P.I. Publication No. 277322/1989, page 7, left upper column, line 15 to right upper column, line 2.

The antistatic agent may include those disclosed, for example, in Japanese Patent O.P.I. Publication No. 285519/1990, page 3, right lower column, line 16 to page 4, left upper column, line 9.

Solvents mixed in magnetic coating compositions used to form the magnetic layers describe above may include toluene, xylene, methyl ethyl ketone, methyl isobutyl ketone, acetone, tetrahydrofuran, dioxane, cyclohexanone, ethyl acetate, ethylene glycol monoacetate, which are those disclosed, for example, in Japanese Patent O.P.I. Publication No. 159828/1989, page 8, right upper column, lines 1 to 16.

The magnetic coating compositions used in the present invention are prepared by kneading and dispersing the magnetic powder, the binder and the lubricant in the solvent optionally together with the lubricant, the dispersant and the antistatic agent. Kneading-dispersing machines used for the kneading and dispersing of materials for the magnetic coating compositions can be exemplified by a twin-roll mill, a three-roll mill, a ball mill, a tron mill, a pebble mill, a co-ball mill, a sand mill, a sand grinder, Szegveri attritor, a high impeller dispersion machine, a high-speed impact mill, a high-speed stone mill, a disper, a high-speed mixer, a homogenizer, an ultrasonic dispersion machine, an open kneader, a continuous kneader, a pressure kneader and a planetary kneader.

Hardeners added after the kneading and dispersion in order to increase the strength and durability of the binders described above may include epoxy compounds and polyisocyanate compounds, which are those disclosed, for example, in Japanese Patent O.P.I. Publication No. 132640/1990, page 9, right upper column, line 1 to right lower column, line 17.

Figure 2:
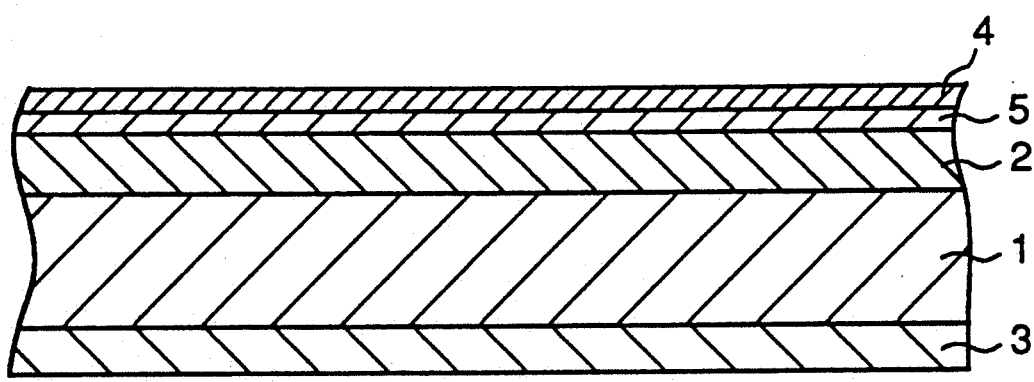
FIG. 2 cross-sectionally illustrates another example of a multi-layer coating magnetic recording medium.

The magnetic recording medium of the present invention as exemplified by a magnetic tape comprises, as shown in FIGS. 1 and 2, a support 1, and magnetic layers 2, 4 and 5 containing the magnetic powder, provided on one side thereof optionally together with an overcoat layer (not shown), which are respectively formed layer by layer in this order.

The magnetic layer 4 contains the ferromagnetic metal powder as the magnetic powder, and the magnetic layer 2 or 5 contains the cobalt-containing magnetic iron oxide powder. The lower layer 2 may be a single layer as shown in FIG. 1. It may also be comprised of two or more layers as shown in FIG. 2.

If necessary, a back coat layer 3 may also be provided on the side opposite to the magnetic layer side. A subbing layer (not shown) may be further provided between the lower layer 2 and the support 1. The support 1 may be subjected to corona discharging.

The multi-layer structure of the magnetic layers according to the present invention should be formed by multi-layer coating of the wet-on-wet system, i.e., a system in which an upper magnetic layer coating composition is applied before a lower magnetic layer coating composition is dried. Of course, it may be formed by the wet-on-dry system, i.e., a system in which an upper layer is formed after a lower layer has been dried, or by any other methods.

Of the magnetic layers, the upper layer is formed in a dried coating thickness (hereinafter simply "coating thickness") of not more than 1.0 μm, preferably from 0.1 to 0.5 μm, and more preferably from 0.1 to 0.4 μm. If this coating thickness is more than 1 μm, it becomes difficult for the lower layer to have its influence, making it impossible to well improve the chroma output.

The lower layer containing the cobalt-containing magnetic iron oxide powder may preferably have a coating thickness of from 0.5 to 3.0 μm, and more preferably from 0.7 to 2.0 μm. The lower layer thus formed should have a coercive force Hc as low as possible so that the chroma output can be improved. An excessively low coercive force, however, may result in a great decrease in RF output. Hence, as a proper range, the coercive force should be in the range of from 500 to 1,200 Oe, preferably from 700 to 1,000 Oe, and more preferably from 800 to 900 Oe.

This Hc can be controlled by varying the following factors.

(1) Co-deposit weight of the cobalt-containing iron oxide used.

(2) $Fe^{2+}$ weight in the cobalt-containing iron oxide used.

Figure 3:
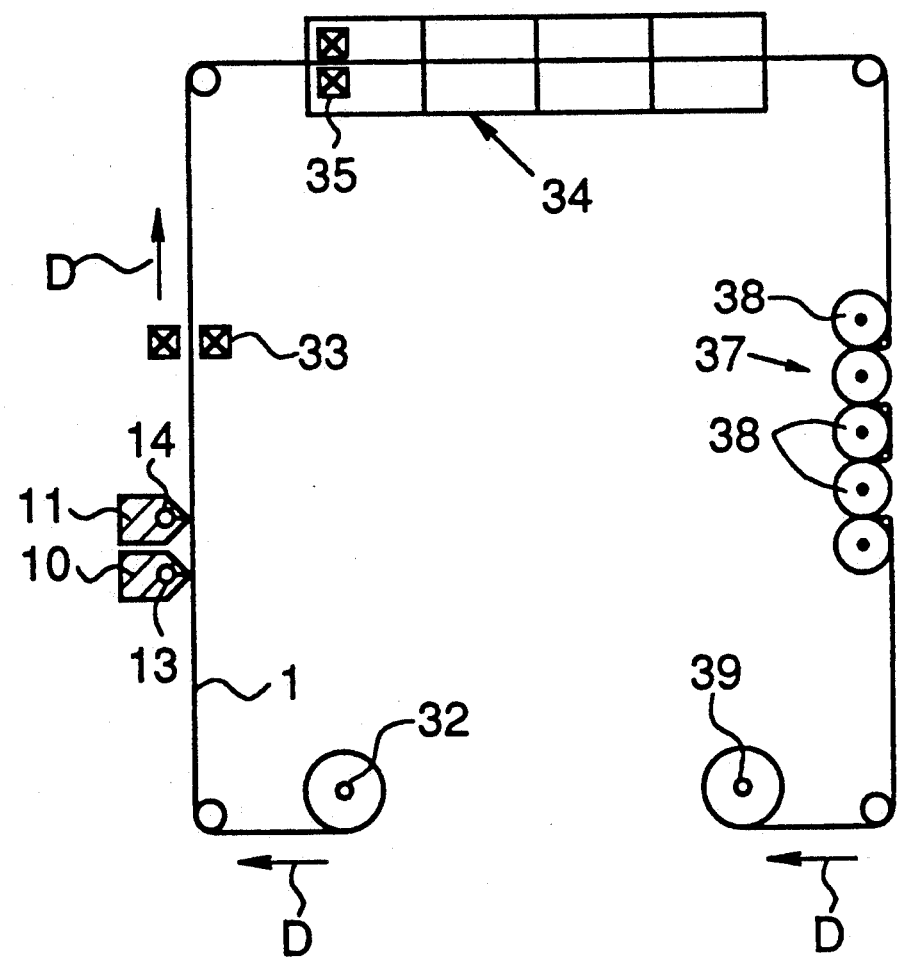
FIG. 3 schematically illustrates an apparatus for manufacturing the magnetic recording medium.

An example of a process for producing a magnetic recording medium by the wet-on-wet system will be described below with reference to FIG. 3. First, to a film-like support 1 fed out of a feed roll 32, magnetic coating compositions for the magnetic layers 2 and 4 as described above are applied by means of extrusion coaters 10 and 11.

Figures 4A, 4B, 4C:
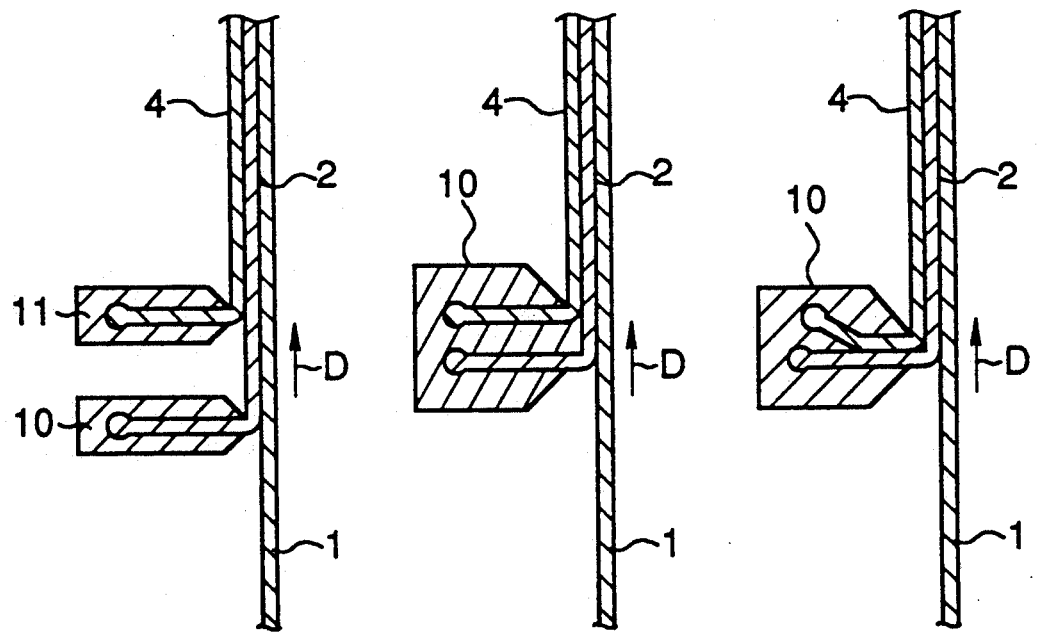
FIGS. 4A to 4C cross-sectionally illustrate examples of extrusion coaters.

Examples of extrusion coaters used to form a plurality of magnetic layers by the wet-on-wet system are shown in FIGS. 4A to 4C. In the drawings, FIG. 4A illustrates a method in which two sets of extrusion coaters placed side by side are used. FIG. 4B illustrates an example in which extrusion slits are separated but outlets are brought together. FIG. 4C illustrates an example in which slits and outlets are brought together.

In the coating process described above, the magnetic coating compositions may be respectively fed to the extrusion coaters 10 and 11 through in-line mixers (not shown). The extrusion coaters 10 and 11 are provided with liquid holders 13 and 14, respectively, where the respective coating compositions fed from the respective coaters are superposed by the wet-on-wet system.

In the multi-layer coating in this wet-on-wet system, the upper magnetic layer coating composition is applied in the state the lower layer coating is wet, so that the surface of the lower layer, i.e., the boundary surface to the upper layer becomes smooth and also the surface properties of the upper layer are improved, and at the same time the adhesion between the upper and lower layers is improved.

As a result, performances required for, e.g., magnetic tapes that must have a high output and a low noise particularly because of high-density recording can be satisfied, and also dropouts can be decreased, so that the reliability can be improved.

At the interface between the upper and lower layers formed by the wet-on-wet system, not only a clear boundary can be substantially present between them but also a boundary region in which components of both the layers are mixed can be present in a given thickness. The layers on the upper side and lower side from which such a region is excluded may serve as the magnetic layers described above. All of these instances are included in the scope of the present invention.

After the magnetic layers have been formed by the wet-on-wet system described above, they are oriented by first stage aligning magnets 33 of, e.g., 2,000 gausses, and then led into a drying assembly 34 provided with second stage aligning magnets 35 of, e.g., 2,000 gausses. Here, hot air is blown from nozzles provided on its top and bottom sides to carry out drying.

Next, the support 1 with the dried coating layers is guided to a super calendering equipment 37 comprised of a combination of calender rolls 38. Here, it is calendered to give a magnetic film, which is then wound around a wind-up roll 39.

The magnetic film sheet thus obtained in slit to produce magnetic tapes.

EXAMPLES

The present invention will be described below by giving Examples together with Comparative Examples. The components, proportions, order of operations can be varied so long as such variations do not deviate from what is intended in the present invention. In the following examples, "part(s)" refers to "part(s) by weight" in all occurrences.

EXAMPLES 1 TO 36 AND COMPARATIVE EXAMPLES 1 TO 12

Upper layer magnetic coating composition

| | |
|---|---|
| Fe—Al type ferromagnetic metal powder (particulars are shown in Table 3) | 100 parts |
| Vinyl chloride resin (see Table 1) | 10 parts |
| Polyurethane resin (see Table 1) | 5 parts |
| Alumina (average particle diameter: 0.2 μm) | 6 parts |
| Carbon black (average particle diameter: shown in Table 3) | in a content as shown in Table 3 |
| Myristic acid | 1 part |
| Butyl stearate | 1 part |
| Methyl ethyl ketone | 100 parts |
| Cyolohexanone | 100 parts |
| Toluene | 100 parts |

Lower layer magnetic coating composition

Prepared in the same manner as the upper layer magnetic coating composition except that the magnetic powder was replaced with cobalt-containing iron oxide treated with silicone and aluminum (particulars are shown in Table 3).

The cobalt-containing iron oxide above contains 0.8% by weight of silicone and 0.1% by weight of aluminum based on the weight of the iron oxide.

The upper layer and lower layer magnetic coating compositions obtained above were each kneaded and dispersed using kneaders and sand mills.

Next, to each of the upper layer magnetic coating composition and lower layer magnetic coating composition thus obtained, 5 parts of polyisocyanate compound (Colonate L, trade name; available from Nippon Polyurethane Industry Co., Ltd.) was added. Thereafter, the magnetic coating compositions were applied to a 10 μm thick polyethylene terephthalate film by the wet-on-wet system. The coatings thus formed were then subjected to magnetic field orientation before they were dried, followed by drying. Thereafter, the surface was smoothed by calendering to form magnetic layers. Here, the calendering was carried out under conditions as shown in Table 2. Coating thickness of each layer was as shown in Table 3.

A back coat layer coating composition formulated as shown below was further applied to the surface of the polyethylene terephthalate film on its side opposite to the magnetic layer side to form a back coat layer with a dried coating thickness of 0.5 μm.

Back coat layer coating composition

| | |
|---|---|
| Carbon black (average particle diameter: 26 mμ) | 40 parts |
| Barium sulfate (average particle diameter: 300 mμ) | 10 parts |
| Nitrocellulose | 25 parts |
| Polyurethane (N-2301, available from Nippon Polyurethane Industry Co., Ltd. | 25 parts |

-continued

| | |
|---|---|
| Polyisocyanate compound (Colonate L, trade name; available from Nippon Polyurethane Industry Co., Ltd.) | 10 parts |
| Cyclohexanone | 400 parts |
| Methyl ethyl ketone | 250 parts |
| Toluene | 250 parts |

A raw sheet thus obtained was slit to produce 8 mm video tapes. Particulars of the resulting 8 mm video tapes and results of evaluation of their performances are shown in Table 3.

EXAMPLES 37 and 38

These are examples in which the magnetic layers are comprised of three layers, an upper layer, an intermediate layer and a lower layer. The upper layer was the same as in Example 1. Cobalt-containing iron oxides as shown in Table 4 were used in the intermediate layer and the lower layer. Except for these, the same procedure as in Example 1 was repeated to give a raw sheet, which was then slit to produce 8 mm video tapes. Particulars of the resulting 8 mm video tapes and results of evaluation of their performances are shown in Table 4.

Methods of evaluation of the performances are shown below.

(a) RF output and chroma output:

Using a noise meter 925 C, manufactured by Shibasoku K.K., outputs are measured on 8 mm Video Movie V900 (manufactured by Sony Corp.).

(b) Lumi. S/N:

To sample tapes, 100% white signals are inputted on the standard level, and then reproduced video signals are inputted to 921 D/1 (a noise meter manufactured by Shibasoku K.K.). From the noise absolute value obtained, lumi. S/N is read.

(c) Chroma S/N:

Using a noise meter manufactured by Shibasoku K.K., a difference in S/N of sample tapes, in chroma signals, is determined in comparison with a standard tape.

(d) Output drop (Running durability):

Tapes are made to run for 100 hours in an environment of 40° C. and 80% RH, and any drop of RF output is measured. In the measurement, EV-S1 (manufactured by Sony Corp.) is used.

(e) Corrosive clogging (Weatherability):

Tapes are left to stand for 30 days in an environment of $NO_2$ (5 ppm). Thereafter, image quality is evaluated and at the same time whether or not the magnetic head has clogged is examined.

(f) Output drop under low humidity (40° C., 20% RH):

Tapes are made to run in their full lengths over 2 passes in an environment of 40° C. and 20% RH, and any drop of RF output is measured. In the measurement, EV-S900 (manufactured by Sony Corp.) is used.

| | Binder No.: | | |
|---|---|---|---|
| | i | ii | iii |
| Type: | Vinyl chloride-vinyl acetate | Vinyl chloride | Vinyl chloride |
| Trade name, etc: | MR120; Nippon Zeon Co., Ltd. | MR110; Nippon Zeon Co., Ltd. | Vinyl chloride containing carboxyl groups |
| Negative organic group: | $-SO_3K$ | $-SO_3K$ | $-COOK$ |
| Content of negative organic group: | 0.05 mmol/g | 0.05 mmol/g | 0.05 mmol/g |

| | Binder No.: | | |
|---|---|---|---|
| | iv | v | vi |
| Type: | Polyurethane | Polyurethane | Polyurethane |
| Trade name, etc: | Polyurethane containing carboxyl groups; Sanyo Chemicals Co., Ltd. | UR8300; Toyobo Co., Ltd. | Polyurethane containing sulfobetaine: Takeda Chemical Industries, Ltd. |
| Negative organic group: | $-COOK$ | $-SO_3Na$ | — |
| Content of negative organic group: | 0.05 mmol/g | 0.1 mmol/g | — |

TABLE 2

| Calendering conditions | Temperature (°C.) | Pressure (Kg/cm²) | C/S (m/min) |
|---|---|---|---|
| (1) | 80 | 300 | 30 |
| (2) | 70 | 250 | 30 |
| (3) | 70 | 200 | 50 |
| (4) | 70 | 180 | 50 |
| (5) | 60 | 200 | 50 |
| (6) | 60 | 150 | 50 |

TABLE 3

| | Example: | | | | | | | | | |
|---|---|---|---|---|---|---|---|---|---|---|
| | 1 | 2 | 3 | 4 | 5 | 6 | 7 | 8 | 9 | 10 |
| Coating thickness (μm) | | | | | | | | | | |
| Upper layer: | 0.5 | 0.5 | 0.5 | 0.5 | 0.5 | 0.5 | 0.5 | 0.5 | 0.7 | 1.0 |
| Lower layer: | 2.5 | 2.5 | 2.5 | 2.5 | 2.5 | 2.5 | 2.5 | 2.5 | 2.3 | 2.0 |
| Magnetic powder (Upper layer) | | | | | | | | | | |
| Type: | Fe—Al | Fe—Al | Fe—Al | Fe—Al | Fe—Al | Fe—Al | Fe—Ni | Fe—Co—Ni | Fe—Al | Fe—Al |
| Metal atom number ratio: | 100:5 | 100:5 | 100:5 | 100:5 | 100:5 | 100:5 | 100:5 | 100:5:5 | 100:5 | 100:5 |
| Average major axis length (μm) | 0.14 | 0.12 | 0.17 | 0.22 | 0.14 | 0.14 | 0.14 | 0.17 | 0.14 | 0.14 |
| Crystallite size: (Å) | 140 | 130 | 170 | 180 | 140 | 140 | 140 | 170 | 140 | 140 |
| Magnetic powder (Lower layer) (Co-containing iron oxide) | | | | | | | | | | |
| Average major axis length: (μm) | 0.32 | 0.32 | 0.32 | 0.32 | 0.27 | 0.35 | 0.32 | 0.32 | 0.32 | 0.32 |
| Crystallite size: (Å) | 400 | 400 | 400 | 400 | 270 | 450 | 400 | 400 | 400 | 400 |
| $Fe^{2+}/Fe^{3+}$: | 0.05 | 0.05 | 0.05 | 0.05 | 0.05 | 0.05 | 0.05 | 0.05 | 0.05 | 0.05 |

TABLE 3-continued

| Binder | | | | | | | | | | |
|---|---|---|---|---|---|---|---|---|---|---|
| Upper layer: | i + iv | ii + v | iii + iv | i + vi | i + v | i + v | i + v | i + v | i + v | i + v |
| Lower layer: | i + iv | ii + v | iii + iv | i + vi | i + v | i + v | i + v | i + v | i + v | i + v |
| Upper layer carbon black | | | | | | | | | | |
| Average particle diameter: (mμ) | 40 | 40 | 40 | 40 | 40 | 40 | 40 | 40 | 40 | 40 |
| Content: (wt %) | 0.8 | 0.8 | 0.8 | 0.8 | 0.8 | 0.8 | 0.8 | 0.8 | 0.8 | 0.8 |
| Lower-layer Hc (Oe) | 900 | 900 | 900 | 900 | 870 | 720 | 900 | 900 | 900 | 900 |
| Calendering conditions | (1) | (1) | (1) | (1) | (1) | (1) | (1) | (1) | (1) | (1) |
| $R_{10z}$ (nm) | 15 | 13 | 16 | 18 | 14 | 17 | 15 | 16 | 14 | 13 |
| RF output (dB) | +3.5 | +4.0 | +2.3 | +1.7 | +3.7 | +3.2 | +2.8 | +1.9 | +3.6 | +3.6 |
| Lumi. S/N (dB) | +3.2 | +3.8 | +2.0 | +1.1 | +3.4 | +2.9 | +2.5 | +1.8 | +3.3 | +3.2 |
| Chroma output (dB) | +4.0 | +3.8 | +4.2 | +4.3 | +3.0 | +4.7 | +3.2 | +3.8 | +2.8 | +0.9 |
| Chroma S/N (dB) | +2.2 | +2.4 | +2.2 | +2.0 | +2.1 | +2.0 | +1.7 | +1.9 | +2.1 | +1.8 |
| Output drop (dB) | −0.8 | −1.4 | −0.5 | −0.3 | −1.2 | −0.4 | −1.0 | −0.8 | −1.2 | −1.7 |
| Corrosive clogging | None | None | None | None | None | None | Occur | Occur | None | None |
| Output drop under low humidity | −0.7 | −1.3 | −0.7 | −0.8 | −1.4 | −0.3 | −1.2 | −1.1 | −0.7 | −0.7 |

| | Example: | | | | | | |
|---|---|---|---|---|---|---|---|
| | 11 | 12 | 13 | 14 | 15 | 16 | 17 |
| Coating thickness (μm) | | | | | | | |
| Upper layer: | 0.5 | 0.5 | 0.5 | 0.5 | 0.5 | 0.5 | 0.5 |
| Lower layer: | 2.5 | 2.5 | 2.5 | 2.5 | 2.5 | 2.5 | 2.5 |
| Magnetic powder (Upper layer) | | | | | | | |
| Type: | Fe—Al | Fe—Al—Ni | Fe—Al—Ni—Zn | Fe—Al—Co—Mn | Fe—Al—Co—Zn | Fe—Al | Fe—Al |
| Metal atom number ratio: | 100:5 | 100:5:2 | 100:5:2:2 | 100:5:2:2 | 100:5:2:2 | 100:5 | 100:5 |
| Averae major axis length: (μm) | 0.14 | 0.14 | 0.14 | 0.14 | 0.14 | 0.14 | 0.14 |
| Crystallite size: (Å) | 140 | 140 | 140 | 140 | 140 | 140 | 140 |
| Magnetic powder (Lower layer) (Co-containing iron oxide) | | | | | | | |
| Average major axis length: (μm) | 0.32 | 0.32 | 0.32 | 0.32 | 0.32 | 0.32 | 0.32 |
| Crystallite size: (Å) | 400 | 400 | 400 | 400 | 400 | 400 | 400 |
| $Fe^{2+}/Fe^{3+}$: | 0.05 | 0.05 | 0.05 | 0.08 | 0.15 | 0.25 | 0.05 |
| Binder | | | | | | | |
| Upper layer: | ii + iv | ii + iv | ii + iv | ii + iv | ii + iv | i + vi | i + vi |
| Lower layer: | ii + iv | ii + iv | ii + iv | ii + iv | ii + iv | i + vi | i + vi |
| Upper layer carbon black | | | | | | | |
| Average particle diameter: (mμ) | 50 | 50 | 50 | 50 | 50 | 40 | 40 |
| Content: (wt %) | 0.6 | 0.6 | 0.6 | 0.6 | 0.6 | 0.8 | 0.8 |
| Lower-layer Hc (Oe) | 905 | 912 | 915 | 920 | 915 | 917 | 1100 |
| Calendering conditions | (2) | (3) | (4) | (1) | (1) | (1) | (1) |
| $R_{10z}$ (nm) | 27 | 39 | 43 | 14 | 14 | 14 | 14 |
| RF output (dB) | +2.1 | +1.2 | +0.8 | +3.7 | +3.8 | +3.9 | +3.5 |
| Lumi. S/N (dB) | +1.9 | +0.7 | +0.5 | +3.3 | +3.5 | +3.5 | +3.3 |
| Chroma output (dB) | +2.4 | +2.1 | +1.8 | +4.9 | +5.3 | +5.7 | +3.1 |
| Chroma S/N (dB) | +1.0 | +0.3 | −0.1 | +2.4 | +2.4 | +2.5 | +2.2 |
| Output drop (dB) | −0.3 | −0.1 | −0.1 | −0.8 | −0.7 | −0.8 | −0.8 |
| Corrosive clogging | None | None | None | None | None | None | None |
| Output drop under low humidity | −0.5 | −0.3 | −0.1 | −0.8 | −0.7 | −0.6 | −0.6 |

| | Example: | | | | | | | | |
|---|---|---|---|---|---|---|---|---|---|
| | 18 | 19 | 20 | 21 | 22 | 23 | 24 | 25 | 26 |
| Coating thickness (μm) | | | | | | | | | |
| Upper layer: | 0.5 | 0.5 | 0.5 | 0.5 | 0.5 | 0.5 | 0.5 | 0.5 | 0.5 |
| Lower layer: | 2.5 | 2.5 | 2.5 | 2.5 | 2.5 | 2.5 | 2.5 | 2.5 | 2.5 |
| Magnetic powder (Upper layer) | | | | | | | | | |
| Type: | Fe—Al—Ca | Fe—Al | Fe—Al | Fe—Al | Fe—Al | Fe—Al | Fe—Al—Ca | Fe—Al—Ca | Fe—Al—Ca |
| Metal atom number ratio: | 100:5:2 | 100:5 | 100:5 | 100:5 | 100:20 | 100:10 | 100:0.5 | 100:5:0.1 | 100:5:1 |
| Average major axis | 0.14 | 0.25 | 0.16 | 0.15 | 0.14 | 0.14 | 0.14 | 0.14 | 0.14 |

TABLE 3-continued

| | | | | | | | | | |
|---|---|---|---|---|---|---|---|---|---|
| length: (μm) | | | | | | | | | |
| Crystallite size: (Å) | 140 | 200 | 170 | 150 | 140 | 140 | 140 | 140 | 140 |
| Magnetic powder (Lower layer) (Co-containing iron oxide) | | | | | | | | | |
| Average major axis length: (μm) | 0.32 | 0.32 | 0.32 | 0.32 | 0.32 | 0.32 | 0.32 | 0.32 | 0.32 |
| Crystallite size: (Å) | 400 | 400 | 400 | 400 | 400 | 400 | 400 | 400 | 400 |
| $Fe^{2+}/Fe^{3+}$: | 0.05 | 0.05 | 0.05 | 0.05 | 0.05 | 0.05 | 0.05 | 0.05 | 0.05 |
| Binder | | | | | | | | | |
| Upper layer: | i + vi | ii + v | ii + v | ii + v | i + vi | i + vi | i + vi | i + vi | i + vi |
| Lower layer: | i + vi | ii + v | ii + v | ii + v | i + vi | i + vi | i + vi | i + vi | i + vi |
| Upper layer carbon black | | | | | | | | | |
| Average particle diameter: (mμ) | 40 | 40 | 40 | 40 | 40 | 40 | 40 | 40 | 40 |
| Content: (wt %) | 0.8 | 0.8 | 0.8 | 0.8 | 0.8 | 0.8 | 0.8 | 0.8 | 0.8 |
| Lower-layer Hc (Oe) | 900 | 900 | 900 | 900 | 900 | 900 | 900 | 900 | 900 |
| Calendering conditions | (1) | (1) | (1) | (1) | (1) | (1) | (1) | (1) | (1) |
| $R_{10z}$ (nm) | 13 | 19 | 16 | 15 | 17 | 15 | 16 | 14 | 12 |
| RF output (dB) | +4.1 | +0.9 | +2.5 | +2.8 | +2.8 | +3.5 | +3.1 | +3.7 | +4.0 |
| Lumi. S/N (dB) | +3.7 | +0.7 | +2.2 | +2.4 | +2.6 | +3.3 | +2.9 | +3.6 | +3.9 |
| Chroma output (dB) | +4.5 | +3.8 | +4.0 | +3.9 | +3.5 | +4.1 | +3.9 | +4.3 | +4.4 |
| Chroma S/N (dB) | +2.4 | +1.3 | +2.2 | +2.1 | +1.7 | +2.3 | +1.9 | +2.4 | +2.5 |
| Output drop (dB) | −0.8 | −0.6 | −0.6 | −0.7 | −0.5 | −0.7 | −1.3 | −0.7 | −0.6 |
| Corrosive clogging | None | None | None | None | None | None | None | None | None |
| Output drop under low humidity | −0.2 | −0.4 | −0.5 | −0.6 | −0.4 | −0.6 | −0.9 | −0.5 | −0.3 |

| | Example: | | | | | | | | | |
|---|---|---|---|---|---|---|---|---|---|---|
| | 27 | 28 | 29 | 30 | 31 | 32 | 33 | 34 | 35 | 36* |
| Coating thickness (μm) | | | | | | | | | | |
| Upper layer: | 0.5 | 0.5 | 0.5 | 0.5 | 0.5 | 0.5 | 0.5 | 0.5 | 0.5 | 0.5 |
| Lower layer: | 2.5 | 2.5 | 2.5 | 2.5 | 2.5 | 2.5 | 2.5 | 2.5 | 2.5 | 2.5 |
| Magnetic powder (Upper layer) | | | | | | | | | | |
| Type: | Fe—Al—Ca | Fe—Al | Fe—Al | Fe—Al | Fe—Al | Fe—Al | Fe—Al | Fe—Al | Fe—Al | Fe—Al |
| Metal atom number ratio: | 100:5:10 | 100:5 | 100:5 | 100:5 | 100:5 | 100:5 | 100:5 | 100:5 | 100:5 | 100:5 |
| Average major axis length (μm) | 0.14 | 0.14 | 0.14 | 0.14 | 0.14 | 0.14 | 0.16 | 0.16 | 0.16 | 0.16 |
| Crystallite size: (Å) | 140 | 140 | 140 | 140 | 140 | 140 | 155 | 155 | 155 | 155 |
| Magnetic powder (Lower layer) (Co-containing iron oxide) | | | | | | | | | | |
| Average major axis length: (μm) | 0.32 | 0.25 | 0.30 | 0.32 | 0.32 | 0.32 | 0.32 | 0.32 | 0.32 | 0.32 |
| Crystallite size: (Å) | 400 | 250 | 300 | 400 | 400 | 400 | 400 | 400 | 400 | 400 |
| $Fe^{2+}/Fe^{3+}$: | 0.05 | 0.05 | 0.05 | 0.05 | 0.05 | 0.05 | 0.05 | 0.05 | 0.05 | 0.05 |
| Binder | | | | | | | | | | |
| Upper layer: | i + vi | ii + v | ii + v | ii + v | i + vi | i + vi | iii + iv | iii + iv | iii + iv | iii + iv |
| Lower layer: | i + vi | ii + v | ii + v | ii + v | i + vi | i + vi | iii + iv | iii + iv | iii + iv | iii + iv |
| Upper layer carbon black | | | | | | | | | | |
| Average particle diameter: (mμ) | 40 | 40 | 40 | 30 | 40 | 40 | 40 | 40 | 40 | 40 |
| Content: (wt %) | 0.8 | 0.8 | 0.8 | 1.0 | 0.8 | 0.8 | 0.8 | 0.8 | 0.8 | 0.8 |
| Lower-layer Hc (Oe) | 900 | 900 | 900 | 900 | 500 | 1,200 | 800 | 800 | 800 | 800 |
| Calendering conditions | (1) | (1) | (1) | (1) | (1) | (1) | (4) | (3) | (2) | (2) |
| $R_{10z}$ (nm) | 14 | 15 | 15 | 16 | 15 | 15 | 50 | 30 | 20 | 16 |
| RF output (dB) | +3.8 | +3.7 | +3.6 | +3.5 | +2.7 | +3.6 | +0.1 | +1.5 | +2.0 | +2.9 |
| Lumi. S/N (dB) | +3.4 | +3.6 | +3.5 | +3.4 | +2.6 | +3.5 | −0.1 | +1.3 | +1.8 | +2.7 |
| Chroma output (dB) | +4.3 | +2.8 | +3.0 | +3.8 | +4.2 | +2.3 | +1.3 | +1.9 | +2.6 | +3.2 |
| Chroma S/N (dB) | +2.3 | +2.2 | +2.1 | +2.2 | +2.2 | +2.0 | −1.2 | +0.6 | +1.5 | +2.0 |
| Output drop (dB) | −0.7 | −1.7 | −0.9 | −0.9 | −0.8 | −0.8 | −0.1 | −0.4 | −0.6 | −0.3 |
| Corrosive clogging | None | None | None | None | None | None | None | None | None | None |
| Output drop under low humidity | −0.2 | −1.9 | −1.0 | −0.8 | −0.7 | −0.7 | −0.1 | −0.4 | −0.5 | −0.7 |

TABLE 3-continued

| | Comparative Example: | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Coating thickness ($\mu$m) | | | | | | | | | | | | |
| Upper layer: | 0.5 | 0.5 | 1.5 | 0.5 | 0.5 | 0.5 | 0.5 | 0.5 | 0.5 | 1.2 | 0.5 | 0.5 |
| Lower layer: | 2.5 | 2.5 | 1.5 | 2.5 | 2.5 | 2.5 | 2.5 | 2.5 | 2.5 | 1.8 | 2.5 | 2.5 |
| Magnetic powder (Upper layer) | | | | | | | | | | | | |
| Type: | Fe—Al | Fe—Al | Fe—Al | Fe—Al | Fe—Al | Fe—Al | Fe—Al | Fe—Al | Fe—Al | Fe—Al | Fe—Al | Fe—Al |
| Metal atom number ratio: | 100:5 | 100:5 | 100:5 | 100:5 | 100:5 | 100:5 | 100:5 | 100:5 | 100:5 | 100:5 | 100:5 | 100:5 |
| Average major axis length: | 0.27 | 0.14 | 0.14 | 0.14 | 0.14 | 0.14 | 0.14 | 0.14 | 0.14 | 0.14 | 0.14 | 0.14 |
| Crystallite size: (Å) | 230 | 140 | 140 | 140 | 140 | 140 | 140 | 140 | 140 | 140 | 140 | 140 |
| Magnetic powder (Lower layer) (Co-containing iron oxide) | | | | | | | | | | | | |
| Average major axis length: ($\mu$m) | 0.32 | 0.23 | 0.32 | 0.32 | 0.32 | 0.32 | 0.32 | 0.32 | 0.32 | 0.32 | 0.32 | 0.32 |
| Crystallite size: (Å) | 400 | 230 | 400 | 400 | 400 | 400 | 400 | 400 | 400 | 400 | 400 | 400 |
| $Fe^{2+}/Fe^{3+}$: | 0.05 | 0.05 | 0.05 | 0.05 | 0.05 | 0.05 | 0.05 | 0.05 | 0.05 | 0.05 | 0.05 | 0.05 |
| Binder | | | | | | | | | | | | |
| Upper layer: | ii + v | ii + v | ii + v | ii + v | ii + v | iii + iv | iii + iv | i + vi | i + vi | i + vi | i + vi | i + vi |
| Lower layer: | ii + v | ii + v | ii + v | ii + v | ii + v | iii + iv | iii + iv | i + vi | i + vi | i + vi | i + vi | i + vi |
| Upper layer carbon black | | | | | | | | | | | | |
| Average particle diameter: (m$\mu$) | 40 | 40 | 40 | 40 | 40 | 40 | 40 | 28 | 40 | 40 | 10 | 40 |
| Content: (wt %) | 0.8 | 0.8 | 0.8 | 0.8 | 0.8 | 0.8 | 0.8 | 0.8 | 1.2 | 0.8 | 0.8 | 1.5 |
| Lower-layer Hc (Oe) | 900 | 900 | 900 | 450 | 1,500 | 900 | 900 | 900 | 900 | 900 | 900 | 900 |
| Calendering conditions | (1) | (1) | (1) | (1) | (1) | (5) | (6) | (1) | (1) | (1) | (1) | (1) |
| $R_{10z}$ (nm) | 21 | 15 | 15 | 15 | 15 | 52 | 60 | 15 | 17 | 15 | 13 | 22 |
| RF output (dB) | +0.5 | +3.8 | +3.5 | +2.0 | +3.7 | −0.1 | −0.7 | +3.6 | +2.5 | +3.6 | +3.6 | +2.3 |
| Lumi. S/N (dB) | +0.4 | +3.6 | +3.3 | +1.7 | +3.5 | 0 | −0.5 | +3.5 | +2.4 | +3.4 | +3.3 | +2.1 |
| Chroma output (dB) | +4.1 | +2.6 | +0.1 | +4.5 | +0.1 | +1.4 | +0.3 | +4.0 | +3.5 | +0.3 | +4.1 | +3.2 |
| Chroma S/N (dB) | +1.2 | +2.1 | +2.1 | +2.3 | +0.9 | −1.0 | −1.7 | +2.3 | +1.7 | +2.2 | +2.1 | +1.5 |
| Output drop (dB) | −0.6 | −2.3 | −3.6 | −0.8 | −0.7 | −0.1 | 0 | −1.8 | −0.8 | −2.9 | −3.5 | −0.2 |
| Corrosive clogging | None | None | Occur | None | None | None | None | None | None | Occur | Occur | None |
| Output drop under low humidity | −0.4 | −2.7 | −3.4 | −0.8 | −0.7 | −0.1 | 0 | −2.4 | −0.5 | −3.2 | −4.3 | −0.4 |

*Cobalt-containing iron oxide in Example 36 was treated with Si and Al, where Si/Fe = 0.008 and Al/Fe = 0.001.

TABLE 4

| | Example: | |
|---|---|---|
| | 37 | 38 |
| Upper layer | | |
| Coating thickness: ($\mu$m) | 0.5 | 0.5 |
| Type of magnetic powder: | Fe—Al | Fe—Al |
| Average major axis length: ($\mu$m) | 0.14 | 0.14 |
| Crystallite size: (Å) | 140 | 140 |
| Intermediate layer | | |
| Coating thickness: ($\mu$m) | 0.5 | 0.5 |
| Type of magnetic powder: | Co-containing iron oxide | Co-containing iron oxide |
| Average major axis length: ($\mu$m) | 0.16 | 0.19 |
| Crystallite size: | 330 | 370 |
| Hc: (Oe) | 850 | 800 |
| Lower layer | | |
| Coating thickness: ($\mu$m) | 2.0 | 2.0 |
| Type of magnetic powder: | Co-containing iron oxide | Co-containing iron oxide |
| Average major axis length: ($\mu$m) | 0.32 | 0.35 |
| Crystallite size: (Å) | 400 | 430 |
| Hc: (Oe) | 700 | 650 |
| Upper layer carbon black | | |
| Average particle diameter: (m$\mu$) | 40 | 40 |
| Content: (wt %) | 0.8 | 0.8 |
| $R_{10z}$ (nm) | 14 | 15 |
| RF output (dB) | +4.0 | +4.0 |
| Lumi. S/N (dB) | +4.0 | +3.9 |
| Chroma output (dB) | +4.7 | +4.8 |
| Chroma S/N (dB) | +2.8 | +2.7 |
| Output drop (dB) | −0.4 | −0.3 |
| Corrosive clogging | None | None |
| Binder | | |
| Upper layer: | i + vi | i + vi |
| Intermediate layer: | i + v | i + v |
| Lower layer: | ii + v | ii + v |
| Output drop under low humidity | −0.5 | −0.4 |

As is clear from the results shown in Tables 3 and 4, the 8 mm video tapes according to the present invention have high electromagnetic conversion characteristics, in particular, high chroma output, and also have excellent running durability and weatherability (corrosion resistance in an environment of $NO_2$). In particular, the electromagnetic conversion characteristics and weatherability are much better improved when the Fe—Al type ferromagnetic metal powder is used in the upper layer, and are remarkably improved especially when the Fe—Al—Ca type one is used.

What is claimed is:

1. A magnetic recording medium comprising a support and provided thereon, a plurality of magnetic layers each containing a magnetic powder and a binder, wherein an outermost magnetic layer of said magnetic layers comprises a ferromagnetic metal powder having an average major axis length of not more than 0.25 μm and a crystallite size of not more than 200 Å and carbon black having an average particle diameter of not less than 30 mμ in an amount of not more than 1% by weight, said outermost magnetic layer having a thickness of not more than 1 μm and a surface roughness $R_{10z}$ of not more than 50 nm, and at least one magnetic layer other than said outermost layer comprises a cobalt-containing magnetic iron oxide powder having an average major axis length of not less than 0.25 μm and a crystallite size of not less than 250 Å, said at least one magnetic layer having a coercive force of from 500 to 1200 Oe.

2. The medium of claim 1, wherein said ferromagnetic metal powder has an average major axis length of less than 0.18 μm and a crystallite size of not more than 180 Å.

3. The medium of claim 1, wherein said ferromagnetic metal powder comprises at least iron and aluminum.

4. The medium of claim 2, wherein said ferromagnetic metal powder comprises iron and aluminum.

5. The medium of claim 1, wherein said ferromagnetic metal powder comprises iron, aluminum and calcium.

6. The medium of claim 1, wherein the atom number ratio $Fe^{2+}$ to $Fe^{3+}$, $Fe^{2+}/Fe^{3+}$ of said cobalt-containing magnetic iron oxide is not less than 0.08.

7. The medium of claim 1, wherein the atom number ratio $Fe^{2+}$ to $Fe^{3+}$, $Fe^{2+}/Fe^{3+}$ of said cobalt-containing magnetic iron oxide is within the range of from 0.15 to 0.45.

8. The medium of claim 1, wherein at least one binder includes a resin having in its molecule an organic group selected from the group consisting of —$SO_3M$, —$PO(OM')_2$, —$OSO_3M$ and —COOM wherein M represents a hydrogen atom or an alkali metal atom, and M' represents a hydrogen atom, an alkali metal atom or an alkyl group.

* * * * *